United States Patent
Paster

(10) Patent No.: US 8,484,338 B2
(45) Date of Patent: Jul. 9, 2013

(54) APPLICATION DETECTION ARCHITECTURE AND TECHNIQUES

(75) Inventor: Steven B. Paster, San Carlos, CA (US)

(73) Assignee: Actiance, Inc., Belmont, CA (US)

( * ) Notice: Subject to any disclaimer, the term of this patent is extended or adjusted under 35 U.S.C. 154(b) by 806 days.

(21) Appl. No.: 12/568,073

(22) Filed: Sep. 28, 2009

(65) Prior Publication Data

US 2010/0085883 A1    Apr. 8, 2010

Related U.S. Application Data

(60) Provisional application No. 61/102,343, filed on Oct. 2, 2008.

(51) Int. Cl.
  *G06F 15/173* (2006.01)
  *G06F 12/14* (2006.01)

(52) U.S. Cl.
  USPC .............................. 709/224; 726/23; 726/24

(58) Field of Classification Search
  USPC .............................. 709/224, 203; 726/23, 24
  See application file for complete search history.

(56) References Cited

U.S. PATENT DOCUMENTS

| | | | |
|---|---|---|---|
| 6,606,663 B1 | 8/2003 | Liao et al. | |
| 6,629,246 B1 | 9/2003 | Gadi | |
| 7,200,634 B2 | 4/2007 | Mendiola et al. | |
| 7,626,991 B2 | 12/2009 | Dollar et al. | |
| 7,707,401 B2* | 4/2010 | Miller et al. | 713/153 |
| 7,793,342 B1 | 9/2010 | Ebrahimi et al. | |
| 7,933,221 B1* | 4/2011 | Pawar et al. | 370/253 |
| 2005/0010765 A1 | 1/2005 | Swander et al. | |
| 2005/0193429 A1 | 9/2005 | Demopoulos et al. | |
| 2005/0251856 A1 | 11/2005 | Araujo et al. | |
| 2007/0071015 A1 | 3/2007 | Wang et al. | |
| 2007/0220064 A1 | 9/2007 | Najork | |
| 2007/0299777 A1 | 12/2007 | Shraim et al. | |
| 2008/0034073 A1 | 2/2008 | McCloy et al. | |
| 2008/0082662 A1 | 4/2008 | Dandliker et al. | |
| 2008/0098463 A1 | 4/2008 | Wikman et al. | |
| 2008/0163380 A1 | 7/2008 | Liu | |
| 2008/0196085 A1 | 8/2008 | Nagoya et al. | |
| 2009/0006592 A1* | 1/2009 | Carter | 709/223 |
| 2009/0064330 A1 | 3/2009 | Shraim et al. | |
| 2009/0070872 A1 | 3/2009 | Cowings et al. | |
| 2009/0077648 A1 | 3/2009 | Swander et al. | |
| 2009/0109845 A1* | 4/2009 | Andreasen et al. | 370/230 |

OTHER PUBLICATIONS

Genova, Z., and Christensen, K.J., "Using signatures to improve URL routing," Performance, Computing, and Communications Conference, 21st IEEE International, 2002, pp. 45-52.

*Primary Examiner* — Thomas Dailey
*Assistant Examiner* — Ebrahim Golabbakhsh
(74) *Attorney, Agent, or Firm* — Kilpatrick Townsend & Stockton LLP

(57) ABSTRACT

An application detection architecture and related techniques are provided for detecting, identifying, and managing network-based applications. In various embodiments, a combined layered approach to application detection and various application-detection techniques provide for quick assessments that move from simplest to complex for rapid detection of unauthorized or misbehaving applications in communication with one or more computer networks. This layering, in some embodiments, further provides scalability and speed for determining and implementing policies that may be applicable to detected network-based application, users, groups, or devices associated with unauthorized network-based applications sending or receiving data via a computer network.

21 Claims, 7 Drawing Sheets

U.S. PATENT DOCUMENTS

2009/0328219 A1 12/2009 Narayanaswamy
2010/0083382 A1* 4/2010 Farley et al. .................... 726/24
2010/0085883 A1* 4/2010 Paster ........................... 370/252
2010/0162348 A1* 6/2010 Narayanan et al. ............... 726/1

* cited by examiner

APPLICATION DETECTION ARCHITECTURE AND TECHNIQUES

CROSS-REFERENCES TO RELATED APPLICATIONS

This Application claims the benefit of and priority to U.S. Provisional Patent Application No. 61/102,343, filed Oct. 2, 2008, entitled "Application Detection Architecture and Techniques," which is herein incorporated by reference in its entirety for all purposes.

This Application is related to commonly owned copending U.S. patent application Ser. No. 12/206,929, filed Sep. 9, 2008, entitled "User Mapping Mechanisms," and commonly owned copending U.S. patent application Ser. No. 12/206,930, filed Sep. 9, 2008, entitled "Hash-Based Resource Matching," which are herein incorporated by reference in their entirety for all purposes.

BACKGROUND OF THE INVENTION

This Application relates generally to systems for managing and processing information, and specifically to an architecture and techniques for managing network-based applications accessed by computer systems and other devices.

With the advent of modern computers and computer networks, users have been provided with a faster electronic means of communicating with each other. Browser applications, such as Internet Explorer from Microsoft Corporation and Firefox from the Mozilla Foundation, can allow users to browse the world-wide web, obtain news information, share photos or music, or the like, through computer networks, such as the Internet. In another example, e-mail and instant messaging can allow users to interact, for example, in real-time communications.

Computer networks can often include hundreds or thousands of network hosts. A network host can be a computer or other hardware device that runs software applications and originates and/or receives network traffic. Network administrators may often be responsible for maintaining these network hosts in proper running order. The network administrators may incorporate a variety of methodologies and devices in an attempt to ensure that any computer network under their supervision operates securely and reliably. To that end, network administrators may often set rules or establish network policies for users, groups, and devices about the types of software applications and network traffic allowed on a network.

Network applications may include software applications on a network host that are responsible for originating and/or receiving network traffic, referred to as network flows. Some network applications may be well-behaved and conform with a network's rules and policies. Other network applications may be poorly-behaved, installing without a user's or network administrator's permission, hiding themselves and their operation, and violating a network's rules and policies. Examples of poorly-behaved network applications may include computer viruses, worms, spyware, and malware applications. Additionally, some more legitimate applications, such as instant messaging applications, file-sharing or other types of peer-to-peer network applications, voice-over IP (VOIP) communication applications, and multimedia applications may be responsible for network flows that can circumvent network policies and jeopardize network security and reliability.

Often, poorly-behaved network applications can attempt to conceal their network flows to avoid detection and disregard network policies. Common evasion techniques may include using non-standard network protocols, dynamic port and channel selection, which limits the effectiveness of monitoring and blocking network ports to control network traffic; HTTP/HTTPS tunneling, which hides network flows in normally-permitted web traffic; Peer-to-Peer onion routing, which selects destination addresses for peer-to-peer routing at random to circumvent destination address blocking; and encryption of network packet data, which prevents network monitors from examining the contents of network packets to identify the type of network flow.

For example, some common peer-to-peer VOIP applications can circumvent network policies in a number of ways. The peer-to-peer VOIP application may dynamically selected different ports and channels for communication. If UDP is blocked, the application can fall back on TCP/IP. Additionally, the peer-to-peer VOIP application may tunnel its data over open ports 80 or 443, which are normally intended for HTTP or SSL traffic. A peer-to-peer VOIP application may dynamically select supernodes in its peer-to-peer network to circumvent destination address detection and blocking. Additionally, data may be encrypted to prevent detection using packet inspection.

Some attempts at controlling network applications generally include monitoring the content, size, and source and destination addresses of network flows as they pass through a gateway or other point in the network. However, due to the above described evasion techniques, these attempts at controlling network applications may have too little information to reliably detect poorly-behaved network applications. Additionally, these attempts at controlling network applications may further have too little information about who initiate an unauthorized network flow.

Accordingly, what is desired is to solve problems relating to managing network-based applications accessed by computer systems and other devices, some of which may be discussed herein. Additionally, what is desired is to reduce drawbacks related to detecting and identifying network-based application that initiate network flows, some of which may be discussed herein.

BRIEF SUMMARY OF THE INVENTION

In various embodiments, techniques are provided for detecting and identifying applications that initiate network flows. In one embodiment, a layered approach to application detection provides scalability and speed, while further providing quick assessments that move from simplest to complex for rapid detection.

In various embodiments, one or more computer systems configured as network traffic managers can detect, identify, and manage network-based applications based on network traffic generated by the network-based applications. In a first phase associated with the network traffic, a network traffic manager can analyze the network traffic with one or more single inspection point engines to determine whether a single inspection point of the network traffic satisfies at least one of the single inspection point engines. In a second phase associated with the network traffic, a network traffic manager can analyze the network traffic and results information associated with the one or more single inspection point engines with one or more multiple inspection point engines to determine whether a plurality of inspection points of the network traffic satisfy at least one of the multiple inspection point engines. In a third phase associated with the network traffic, a network traffic manager can analyze the network traffic, results information associated with the one or more single inspection point engines, and results information associated with the one or more multiple inspection point engines with one or more custom inspection point engines to determine whether the network traffic satisfies at least one of the custom inspection point engines.

A network traffic manager can then identify a network-based application that generated the network traffic based on results information obtained from at least one of the first phase, the second phase, or the third phase. A network traffic manager can determine one or more policies that are applicable to the network-based application. A network traffic manager can perform an action defined by the one or more policies that are applicable to the network-based application in regard to the network-based application, such as blocking the network traffic, modifying the network traffic, logging the network traffic, preventing further execution of the network-based application, or the like.

In one embodiment, in the first phase associated with the network traffic, a network traffic manager may analyze the network traffic with the one or more single inspection point engines for an IP address, an IP port, presence of a single value in a packet header, or presence of a single value in a packet body. In the second phase associated with the network traffic, a network traffic manager may analyze the network traffic and results information associated with the one or more single inspection point engines with the one or more multiple inspection point engines for a combination of IP address and an IP port, presence of a plurality of values in a packet header, presence of a plurality of values in a packet body, or other combinations thereof. In the third phase associated with the network traffic, a network traffic manager may analyze the network traffic, results information associated with the one or more single inspection point engines, and results information associated with the one or more multiple inspection point engines with one or more custom inspection point engines according to processing logic specified by the one or more custom inspection point engines. Custom inspection point engines may be configured for data structures and processing logic for detecting specific network-based applications. The one or more custom inspection point engines may further maintain state information across one or more packets.

In further embodiments, a network traffic manager may determine a policy that is applicable to a network-based application based on one or more characteristics of the network traffic, the network-based application, one or more users associated with the network-based application, one or more groups associated with the network-based application, one or more machines or devices associated with the network-based application, or combinations thereof.

In various embodiments, one or more network traffic managers associated with an organization may be configured to receive one or more updates from a service provider. The one or more updates can include information for configuring or providing single/multiple/custom inspection point engines for determining whether network traffic satisfies a particular inspection point engine. The one or more updates may further include information that updates the configuration of at least one of the single inspection point engines, the multiple inspection point engines, or the custom inspection point engines.

In additional embodiments, one or more computer-readable storage media storing a computer program product, processor-executable instructions or code, or program logic are provided that implement, in a first phase associated with network traffic, analysis of the network traffic with one or more single inspection point engines to determine whether a single inspection point of the network traffic satisfies at least one of the single inspection point engines, in a second phase associated with the network traffic, analysis of the network traffic and results information associated with the one or more single inspection point engines with one or more multiple inspection point engines to determine whether a plurality of inspection points of the network traffic satisfy at least one of the multiple inspection point engines, and in a third phase associated with the network traffic, analysis of the network traffic, results information associated with the one or more single inspection point engines, and results information associated with the one or more multiple inspection point engines with one or more custom inspection point engines to determine whether the network traffic satisfies at least one of the custom inspection point engines. The computer-readable storage media may include a computer program product, processor-executable instructions or code, or program logic that identify a network-based application that generated the network traffic based on results information obtained from at least one of the first phase, the second phase, or the third phase, determine one or more policies that are applicable to the network-based application, and perform action defined by the one or more policies that are applicable to the network-based application in regard to the network-based application.

A further understanding of the nature of and equivalents to the subject matter of this disclosure (as wells as any inherent or express advantages and improvements provided) should be realized by reference to the remaining portions of this disclosure, any accompanying drawings, and the claims in addition to the above section.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or or examples, or the presently understood best mode of any innovations presented within this disclosure.

DETAILED DESCRIPTION OF THE INVENTION

In various embodiments, techniques are provided for detecting and identifying applications that initiate network flows. In one embodiment, a layered approach to application detection provides scalability and speed, while further providing quick assessments that move from simplest to complex for rapid detection. For example, in a 1st Tier of single inspection point (SIP) engines, a series or sequence of one or more inspection engines are utilized that provide a single look analysis at a network flow, such as for information from a single packet, a URL, hostname, IP, or the like. In a 2nd Tier of multiple inspection point (MIP) engines, a series or sequence of one or more inspection engines are utilized to generate a correlation between a set of multiple data points in the network flow, such as using string matching, USER_AGENT, packet number, flow direction, stream offset, connection type, or the like. In a 3rd Tier, custom dissectors can be called from the MIP tier or SIP tier for use as a final stage fall through for deep analysis of the network flow. In one embodiment, the 3rd Tier may be used when packet spanning is required to determine the identity of an application that originated the network flow.

In various embodiments, an application detection architecture may incorporate these techniques and well as others that include, two-dimensional hashing, sparsely populated arrays, an integer-oriented approach to string matching, protocol state information maintained in "probes," wide use of shared memory, and dynamic loaded libraries and "filter updates" for scalability, speed, and to offer quick assessments for rapid detection. In some embodiments, as a result, network packets may be thus examined in real-time or substantially in real-time, for example, at 1 Gbit line rates. Accordingly, an application detection architecture may be employed that utilizes techniques that are computationally fast, yet accurate for their purposes.

In further embodiments, an application detection architecture may incorporate the multiple (e.g., three) tiers or processing layers to balance detection accuracy and computational requirements, such as:

A 1st Tier: Rapid quick-hit packet engine that addresses, for example, up to ~60% or more of the application space.

A 2nd Tier: More complex engine that effectively conducts multiple tests that addresses, for example, up to ~35% or more of the application space.

A 3rd Tier: Customized engine for in-depth analysis also capable of packet spanning needed for, for example, up to ~5% or more of the application space.

Figure 1:
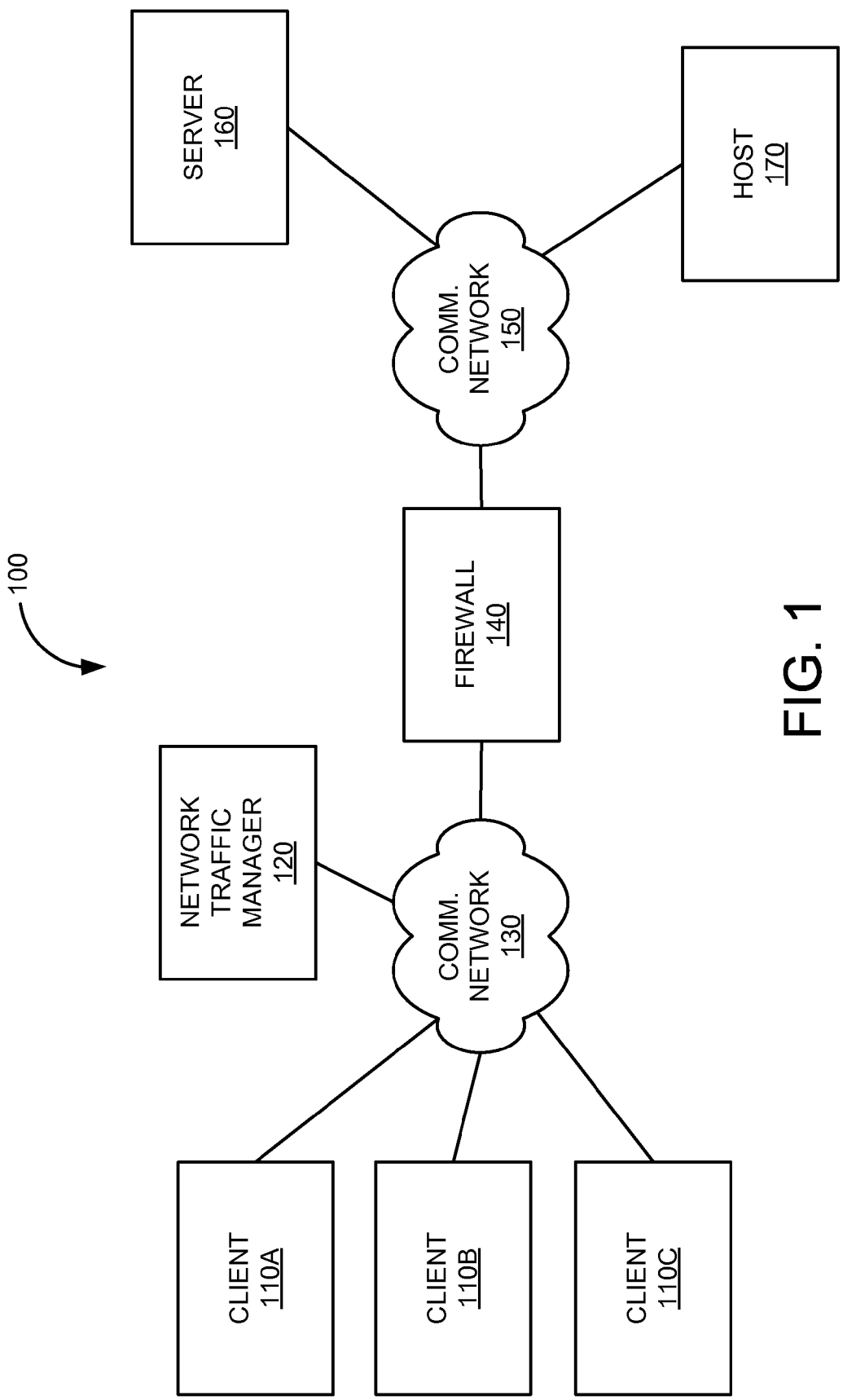
FIG. 1 is a block diagram of a system that may incorporate techniques for detecting and identifying applications that initiate network flows in various embodiments according to the present invention.

FIG. 1 is a block diagram of system 100 that may incorporate techniques for detecting and identifying applications that initiate network flows in various embodiments according to the present invention. In this example, system 100 can include a plurality of clients 110 (e.g., client 110A, client 110B, and client 110C), network traffic manager 120, communications network 130, firewall 140, communications network 150, server 160, and host 170.

Clients 110 can include hardware and/or software elements configured for sending and/or receiving network traffic (e.g., network flows). Some examples of clients 100 are any computing devices, such as any computer systems, personal computers (PC), laptops, workstations, network appliances, mainframes, pocket PCs, personal digital assistants (PDAs), smartphones (BLACKBERRY OR IPHONE devices), telephones, cellular phones, pagers, etc, or other systems or devices having programmable processors or logic circuitry. Clients 110 may be embodied as network hosts that include operating systems and software applications that are responsible for originating and/or receiving network flows. In one example, client 110A may host software applications that send instant message (IM) communications that include textual messages. In another example, client 110B may host web-based applications that send application-specific communications that include encrypted or compressed data. In yet another example, client 110C may host software applications that proxy or relay VOIP communications between two or more network hosts.

Network traffic manager 120 can include hardware and/or software elements configured for managing network flows associated with communications network 130. One example of components of network traffic manager 120 is discussed further with respect to FIG. 2. Network traffic manager 120 may be embodied as any computing device, such as clients 110, and may be implemented as a standalone device, a network appliance, a virtual machine, or the like. In some embodiments, network traffic manager 120 may be embodied as a hardware and/or software component of a system offering network services, such as firewall protection, intrusion detection, antivirus/malware detection, host configuration services, domain name services, directory services, file/printer sharing services, or the like.

In some embodiments, network traffic manager 120 may be implemented in a proxy server model, a server model, an event model, or any combination thereof. In a proxy server model, network traffic manager 120 may be situated to be in communication with communications network 130 and configured to act as a proxy or intermediary for communications between clients 110 and hosts coupled to communications networks 130 and 150. Network traffic manager 120 may support one or more communications protocols, such as any kind of open source, commercially available, or reverse engineered proprietary protocols, and proxy mechanisms thereof (e.g., SOCKS, HTTP, HTTPS). In a proxy server model, network traffic manager 120 may intercept network traffic or network flows originating from or destined to clients 110. In one example, client 110A may connect to hosts coupled to communications networks 130 and 150 for communication using network traffic manager 120 by specifying host and port settings of network traffic manager 120 in proxy settings/preferences of client 110A. Network traffic manager 120 may then negotiate connections and communications on behalf of and to client 110A.

In a server model, network traffic manager 120 network traffic manager 120 may be situated to be in communication with communications network 130 and configured to communicate with hosts coupled to communications networks 130 and 150 in a client-server fashion. Network traffic manager 120 may support one or more communications protocols, such as any kind of any kind of open source, commercially available, or reverse engineered proprietary protocols, (e.g., HTTP, HTTPS, FTP, SMTP, POP3, IMAP, IM protocols, SIP, etc.). For example, network traffic manager 120 may communicated with client 110B using a proprietary messaging protocol that is specially defined for use between client 110B and network traffic manager 120.

In an event model, network traffic manager 120 may be situated to be in communication with another system or device (e.g., directly or through communications network 130) and configured to interact with the another system or device based on one or more events generated by the another system or device. In various embodiments, network traffic manager 120 may be coupled directly or indirectly to a router or network appliance deployed in communications network 130. In one example, a router or network appliance may be responsible for sending events to network traffic manager 120 based on an analysis of a network flow. An event may include information indicating an occurrence in network traffic observed by a router or network appliance (e.g., an HTTP GET request, an IM client signed on/off; an IM client sent a text message to another IM client; the presence status of an IM client has changed; or the like). Once receiving an event, network traffic manager 120 may process information sent with the event or access event information from the router or appliance through an interface (typically an application programmer's interface, or API for short). Network traffic manager 120 thus receives events encapsulating various details concerning network traffic flows.

Communications network 130 can include hardware and/or software elements configured for communicating data. Some examples of communications network 130 can include a public network, a private network, an enterprise local area network, an extranet, a wide area network, a metropolitan area network, or the like. In some embodiments, communications network 130 may form an enterprise network that defined by firewall 140. Firewall 140 can include hardware and/or software elements configured for managing communications between communications networks 130 and 150, often to prevent information from leaving communications network 130 or limit exposure to attacks from communications network 150. In these embodiments, any devices behind firewall 140 may be considered part of the enterprise network. Other devices outside of firewall 140 may be considered to be outside of the enterprise network. Accordingly, clients 110 and network traffic manager can be considered part of the enterprise network. Although firewall 140 is shown, it can be understood that firewall 140 may not be included in system 100.

Communications network 150 can include hardware and/or software elements configured for communicating data. Some examples of communications network 150 can include a public network, a private network, an enterprise local area network, an extranet, a wide area network, a metropolitan area network, the Internet, or the like. In some embodiments, communications network 150 may provide network access to one or more servers, hosts, or information sources, such as server 160 or host 170. Server 160 can include hardware and/or software elements configured for providing services to one or more of clients 110. For example, server 160 may include a server computer providing a web server, an application server, an FTP server, a VoIP server, or the like. Host 170 can include hardware and/or software elements configured for communicating with one or more of clients 110. For example, host 170 may include a server computer, network host, or other device providing a peer-to-peer (P2P) program, an instant messaging client or other chat program, a Skype or VOIP endpoint, or the like.

In one example of operation, network traffic monitor 120 may include or form part of an application detection architecture that attempts to detect and identify network-based applications from network traffic or flows. Network traffic monitor 120 may receive network traffic that may have been initiated by or originated from one or more network-based applications. A network-based application can include any software application, application component, plug-in, module, or set of code configured for sending data to a network host through a communications network or any software application, application component, plug-in, module, or set of code configured for receiving data send from a network host through a communications network. Network traffic monitor 120 may employ one or more dissection engines or application detection tests to detect and identify network-based applications from the network traffic. Once an application is identified, network traffic monitor 120 may determine and/or enforce rules, policies, procedures, audits, or the like, based on the detected applications or devices/users/groups associated with the detected application.

Figure 2:
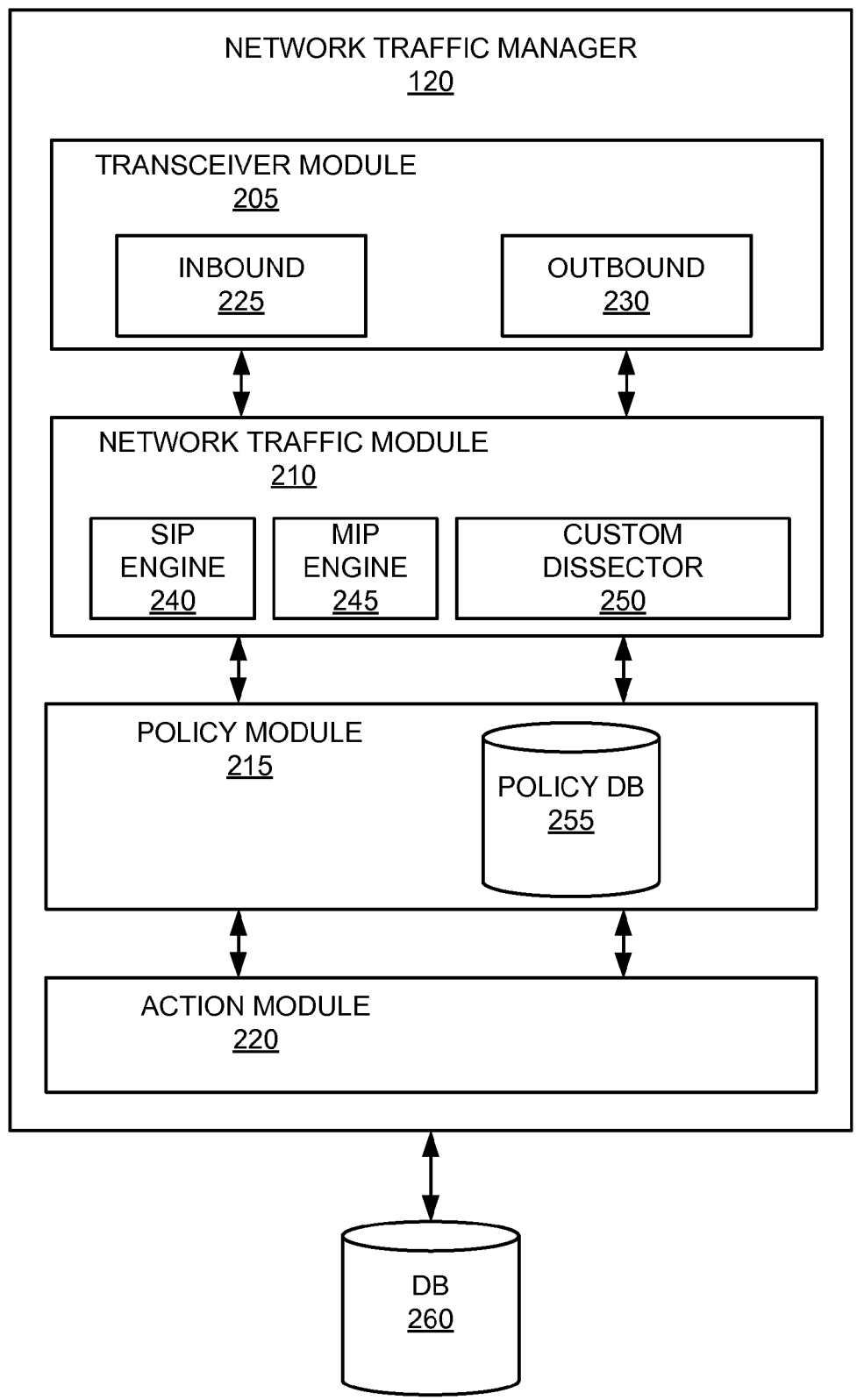
FIG. 2 is a block diagram of an embodiment of a network traffic manager that may be included in the system of FIG. 1 in one embodiment according to the present invention.

FIG. 2 is a block diagram of an embodiment of network traffic manager 120 that may be included in system 100 of FIG. 1 in one embodiment according to the present invention. Network manager 120 may be embodied as a single computing device or as multiple computing devices implementing different aspects of the disclosed functionality. In this example, network traffic manager 120 includes transceiver module 205, network traffic module 210, policy module 215, and action module 220.

Transceiver module 205 can include hardware and/or software elements configured for receiving data, such as from communications networks 130 and 150 or directly from another device, and for transmitting data, such as to a host coupled to one of communications networks 130 and 150 or directly to another device. In one embodiment, transceiver module 205 may include inbound transceiver module 225 and outbound transceiver module 230. Inbound transceiver module 225 can include hardware and/or software elements configured for receiving data. Inbound transceiver module 225 may handle network traffic received at one or more communications interfaces (not shown) associated with network traffic manager 120, such as from clients 110 or server 160 of FIG. 1. Outbound transceiver module 230 can includes hardware and/or software elements configured for transmitting data. Outbound transceiver module 230 may handle network traffic generated by or originating from network traffic manager 120 for transmission via one or more communications interfaces (not shown) associated with network traffic manager 120, which may include network traffic generated on behalf of clients 110 or to server 160.

In various embodiments, transceiver module 205 can be communicatively coupled to network traffic module 210. Network traffic module 210 can include hardware and/or software elements configured for analyzing network traffic. In one example, network traffic module 210 may be responsible for identifying an application that produced the network traffic or network flow. In another example, network traffic module 210 may be responsible for identifying users, groups, and/or machines responsible for the network traffic. In other embodiments, network traffic manager may directly or indirectly determine or enforce rules, policies, privileges, or the like, for detected applications.

In some embodiments, network traffic module 210 can receive network flows to be analyzed or data about the network flows to be analyzed from different sources. For example, network traffic monitor 120 may receive network traffic or network flows monitored directly in system 100. In another example, network traffic monitor 120 may receive data about network flows from another device in system 100, such as one or more of clients 110. Network traffic module 210 can collect the information on network flows being sent from or received by network-based applications within system 100. Some examples of the information collected, either directly from network traffic or from other sources can include the source and destination addresses of network packets, the size of network data in network packets, the contents of network packets, the rate of related network packets in a network flow, other attributes of one or more network packets in a network flow, host information, user information, operating system information, or the like.

In various embodiments, network traffic module 210 can use the information on network flows being sent from or received by network-based applications to reliably identify the network flows and any associated network-based applications. Network traffic module 210 may employ a variety of techniques for detecting and identifying a given network-based application. In some embodiments, a layered approach to application detection provides scalability and speed, while further providing quick assessments that move from simplest to complex for rapid detection. For example, in a 1st Tier of single inspection point (SIP) engines, a series or sequence of one or more inspection engines are utilized that provide a single look analysis at a network flow, such as for information from a single packet, a URL, hostname, IP, or the like. In a 2nd Tier of multiple inspection point (MIP) engines, a series or sequence of one or more inspection engines are utilized to generate a correlation between a set of multiple data points in the network flow, such as using string matching, USER_AGENT, packet number, flow direction, stream offset, connection type, or the like. In a 3rd Tier, custom dissectors can be called from the MIP tier or SIP tier for use as a final stage fall through for deep analysis of the network flow. In one embodiment, the 3rd Tier may be used when packet spanning is required to determine the identity of an application that originated the network flow.

For example, network traffic module 210 may include single inspection point (SIP) engine 240, multi-inspection point (MIP) engine 250, and custom dissector engine 260. SIP engine 240, MIP engine 250, and/or custom dissector 260 may include one or more inspection engines. These inspection engines may be loaded at startup or runtime for network traffic processing and application detection. An inspection engine may be configured by configuration data, such as detection rules that may be dynamically loaded and updated. Some examples of inspection engines that may be employed by SIP engine 240, MIP engine 250, and/or custom dissector 260 can include:

Protocol Parsing Engine—a component that can parse IP and TCP headers to garner information useful later in later detection stages. The engine may attempt to identify session layer protocols as well, such as HTTP, SMTP, HTTPS, FTP, or the like.

IP Address Inspection Engine—a component that can check for IP addresses that have been associated with managed applications. The engine may make identifications based solely on both host IP addresses, but in some embodiments, may also work on a range of IP addresses, such as when supplied with a netmask. The engine may further provide identifications that involve IP addresses combined with port numbers.

Hostname to IP Address Conversion—a component that can convert hostnames to IP addresses. Since the association between hostnames and IP addresses can be fluid and may change, the engine may periodically check with the DNS system to retrieve DNS information, such as a hostnames' current IP addresses.

HTTP Hostname Inspection Engine—a component that can examine hostnames in an HTTP header to identify managed HTTP-based protocols.

HTTP URL Inspection Engine—a component that can inspect HTTP URLs to identify managed HTTP-based protocols.

Octet Inspection Engine—a component that can inspect payloads (e.g., TCP or UDP payloads) for recognizable sequences of octets (e.g., strings).

Dynamically Loaded Custom Dissectors—a component that can control or manage a collection of protocol specific detectors. These protocol specific detectors may be loaded dynamically at run-time.

Probe System for tracking historical information. In some embodiments, custom dissectors may include a system for tracking state information that transcends multiple packets. This information can be protocol and custom dissector specific.

SIP engine 240 can include hardware and/or software elements configured for identifying a network-based application from network traffic or a network flow using at least one inspection point. In one example, an inspection point may include at least one data point in network traffic or a network flow, such as an IP address, a URL, a hostname, a domain or domain name, a filename, or the like. SIP engine 240 may be embodied as a single engine configured to perform a series or sequence of SIP tests or as a logical series or sequence of SIP test-specific engines. SIP engine 240 may generate information used to identify a network-based application from the network traffic or network flow and indicators quantifying confidence that the network-based application has been identified. SIP engine 240 may further generate information used to invoke MIP engine 250 or Custom dissector engine 260 for further analysis.

MIP engine 250 can include hardware and/or software elements configured for identifying a network-based application from network traffic or a network flow using one or more inspections points. The one or more inspection points may include multiple data points or combinations of information that represent a data structure, such as a SIP signature, Src/Dest IP:Port, or a combination of information such as packet number, packet length, stream offset, connection type (HTTPS, SOCKS, UNKNOWN, HTTP, HTTP DIRECT, etc.), packet flow direction, variable string patterns, or the like. MIP engine 250 may be embodied as a single engine configured to perform a series or sequence of MIP tests or as a logical series or sequence of MIP test-specific engines. MIP engine 250 may generate information used to identify a network-based application from the network traffic or network flow and indicators quantifying confidence that the network-based application has been identified. MIP engine 250 may further generate information used to invoke Custom dissector engine 260 for further analysis.

Custom dissector engine 260 can include hardware and/or software elements configure for identifying a network-based application from network traffic or a network flow using application-specific code. The application-specific code can include data structures and/or processing logic that configure Custom dissector engine 260 to more thoroughly analyze the network traffic or network flow. For example, a network-based application may not be readily identified by inspecting individual or multiple data points in packet headers or packet contents. Processing logic associated with application-specific code may be used to compute checksums or maintain state across multiple data points or multiple packets to identify a network-based application.

In various embodiments, network traffic module 210 can be communicatively coupled to and interface with policy module 215. Policy module 215 can include hardware and/or software elements configured for providing and enforcing policies for network traffic or network flows. A policy can include a set of rules, conditions, and actions. A policy may further be associated with one or more users, groups of users, applications, devices, machines, or the like. Policies can be used to block, throttle, accelerate, enhance, or transform network traffic that is part of an identified network flow. In an embodiment, policies for network flows may be enforced by network traffic controlling devices such as switches, routers, firewalls, proxies, IPS, and EPS systems. Network traffic module 210 and policy module 215 can communicate with network traffic controlling devices via any interface or protocol, such as SNMP.

Policy module 215 may be configure to access a number of policies. In one embodiment, policy module 215 may include policy database 255 that stores a set of policies. As shown, policy database 255 is located in policy module 215; however, it will be understood that policy database 255 may be located anywhere in network traffic manager 120 or be separate from network traffic manager 120.

The policies in policy database 255 may include information about actions that can be taken by network traffic monitor 120. The policies may be applied to a packet, group of packets, a network flow, a user, a device, or the like. Policy module 215 may determine from user information, group information, machine information, characteristics related to network flows, or the like whether any policies in policy database 255 applies. Policy module 215 may communicate with network traffic module 210 to enforce policies for detected applications. Once a policy is determined by policy module 215, action module 220 may be configured to perform the action corresponding to the determined policy.

In various embodiments, database 260 may be used to store information usable for network traffic monitor 120. Database 260 may be included in network traffic monitor 120 or be separate from network traffic monitor 120. In one embodiment, database 260 can includes one or more information items including but not limited to: credential information, user information, user to IP address mappings, client identifications for clients 110, policies that may be implemented by policy module 215, or the like. This information is used by modules in network traffic manager 120 for any purpose.

Accordingly, in various embodiments, network traffic manager 120 can detect and identify network-based applications that initiate network flows. A layered approach employed by network traffic manager 120 in some embodiments to application detection can provide scalability and speed, while further providing quick assessments that move from simplest to complex for rapid detection and policy enforcement.

Figure 3:
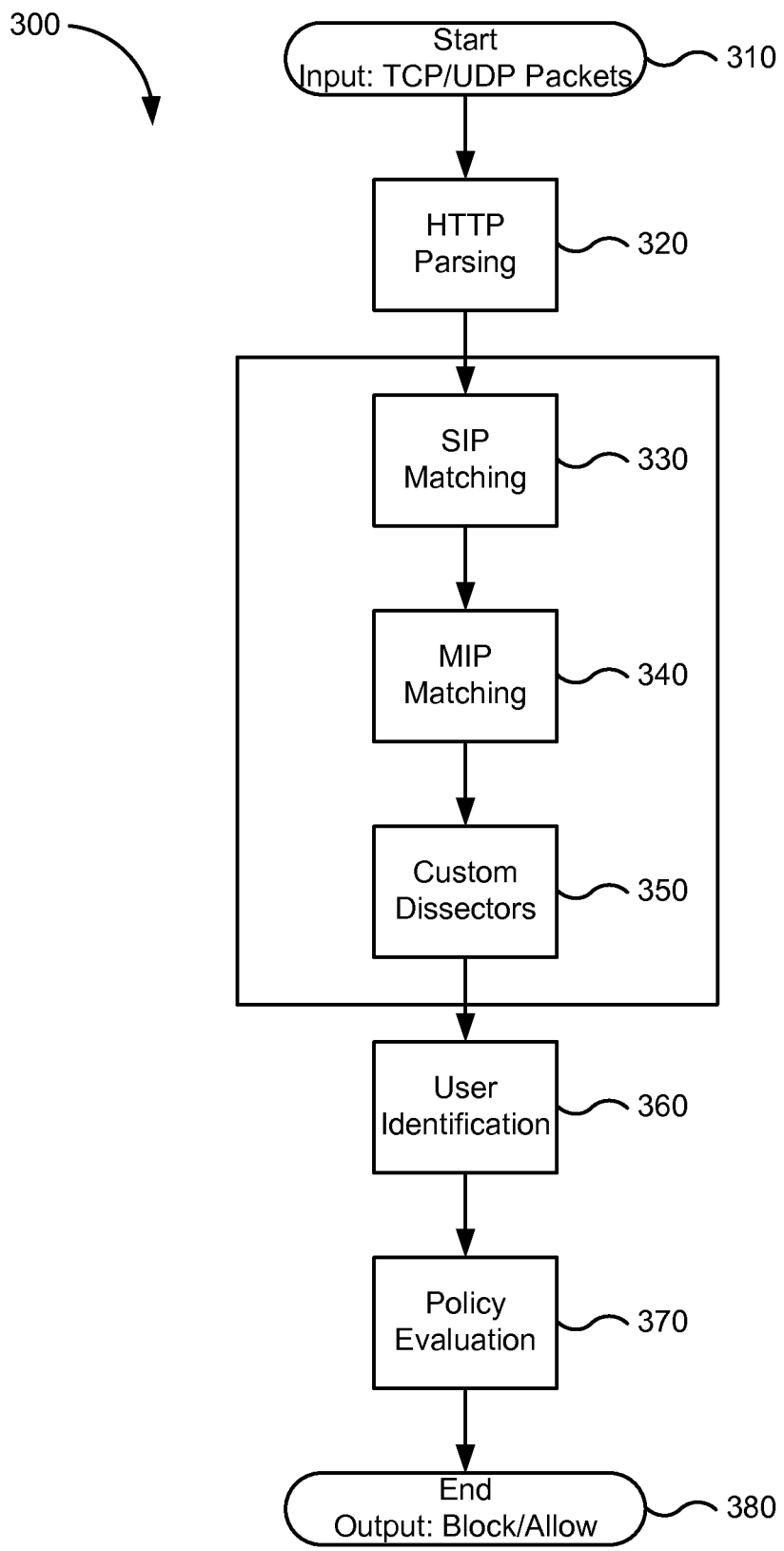
FIG. 3 is a simplified flowchart of a method for detecting and managing network-based applications in one embodiment according to the present invention.

FIG. 3 is a simplified flowchart of method 300 for detecting and managing network-based applications in one embodiment according to the present invention. The processing of method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

Method 300 depicted in FIG. 3 begins in step 310. In step 310, network traffic is received. For example, network traffic monitor 120 of FIG. 1 may receive one or more of a transmission control protocol (TCP) packet or user datagram protocol (UDP) packet. In step 320, HTTP processing is performed on the network traffic. For example, the network traffic may be broken down into one or more elements or data points. A packet, for example, may be decomposed into one or more elements, such as a source address, a destination address, a source port, a destination port, a set of header fields/flags, one or more checksums, or the like. Such preprocessing may simply or otherwise accelerate subsequent processing of the network traffic by one or more engines of a multi-tiered or layered application detection process such as including steps 330, 340, and 350, as shown.

In step 330, for example, single inspection point (SIP) matching can be performed. In various embodiments, one or more inspection or dissection engines can be used to process the network traffic via a single data element or data point of the network traffic. A plurality of SIP engines may be daisy chained for rapid application detection. The plurality of SIP engines may be ordered based on criteria, such as processing time, effectiveness, dependencies or other requirements, state, or the like. In some configurations, the plurality of SIP engines may process the network traffic in parallel. Results obtained from the plurality of SIP engines may be used to identify a network-based application that originated the network traffic or invoke MIP engines or Custom dissector engines.

In step 340, for example, multiple inspection point (MIP) matching can be performed. In various embodiments, one or more inspection or dissection engines can be used to process the network traffic via a set of multiple data elements or data points of the network traffic. A plurality of MIP engines may be daisy chained for more detailed application detection. The plurality of MIP engines may be ordered based on criteria, such as processing time, effectiveness, dependencies or other requirements, state, or the like. In some configurations, the plurality of MIP engines may process the network traffic in parallel. Results obtained from the plurality of MIP engines may be used to identify a network-based application that originated the network traffic or invoke Custom dissector engines. In one example of multiple data point processing, the network traffic may be inspected for strings that match a lexicon associated with one or more network-based applications. Other types and combinations of information may be analyzed, such as agent identifiers, packet lengths, flow control information, connection type information, or the like.

In step 350, for example, custom dissection matching can be performed. In various embodiments, one or more inspection or dissection engines can be used to process the network traffic according to custom dissector code. One custom dissection engine may be invoked for deep packet inspection or a plurality of custom dissection engines may be daisy chained. The plurality of MIP engines may be ordered based on criteria, such as processing time, effectiveness, dependencies or other requirements, state, or the like. In some configurations, a plurality of custom dissection engines may process the network traffic in parallel. In various embodiments, a custom dissector engine may be protocol specific, application specific, or the like. A custom dissector engine may include dissector code or processing logic to maintain state of network traffic, perform analysis that span multiple packets, analyze payload information, determine the use of encryption, or the like.

In some embodiment, the processing of method 300 in steps 330, 340, and 350 may occur serially or in parallel. In one example, if SIP matching results in information providing a match between the network traffic and a network-based application, then network traffic monitor 120 may have a degree of knowledge sufficient to detect that the network-based application actually initiated and is the source of the network traffic. Therefore, network traffic monitor 120 may dispense with performing more computationally or time-intensive analyses, such as may be performed in steps 350 and 360. Similarly, in another example, a match or fail at one inspection tier or layer may bypass or cause to be invoked inspection at another tier or layer.

In various embodiment, in step 360, a user associated with the network traffic can be identified. The user may be identified from the network traffic itself, such as embedded identifying information or from information obtained from another source, such as the machine or computer system identified as the source of the network traffic. One example of a user identification mechanism that may be used with the described techniques can be found in commonly owned co-pending U.S. patent application Ser. No. 12/206,929, filed Sep. 9, 2008 and entitled "User Mapping Mechanisms," which is herein incorporated by reference in its entirety for all purposes.

In step 370, evaluation of one or more policies that are determined to be applicable can be performed. For example, based on identifying a given network-based application from the network traffic, one or more policies may be determined that are applicable to the network-based application. The one or more policies may include criteria that are satisfied by the type of network-based application, operation of or behavior of the network-based application, attributes of network traffic sent by or received by the network-based application, or the like. Additionally, based on identifying a given network-based application from the network traffic, one or more policies may be determined that are applicable to the user identified to be associated with the given network-based application that initiated network traffic. The one or more policies may include criteria that are satisfied by information associated with the user, a group to which the user belongs, a role, or the like.

In various embodiments, evaluation of the one or more policies that are applicable can result in performance of actions specified by the policies. For example, network traffic associated with unauthorized network-based applications may be prevented from leaving communications network 130 of FIG. 1. In another example, network traffic associated with unsupported network-based applications may be logged or audited. In yet another example, the contents of network traffic associated with a given network-based application may be modified, such as to add a disclaimer, remove confidential information, or the like.

Therefore, network traffic manager 120 may control network-based applications as network traffic passes through a gateway or other point in communications network 130. As a result, network administrators may enforce policies for network-based applications that do not require administrator privileges to install or that are included in social networking websites that may behave poorly or fail to comply with an organizations acceptable use policy. FIG. 3 ends in step 380.

Figure 4:
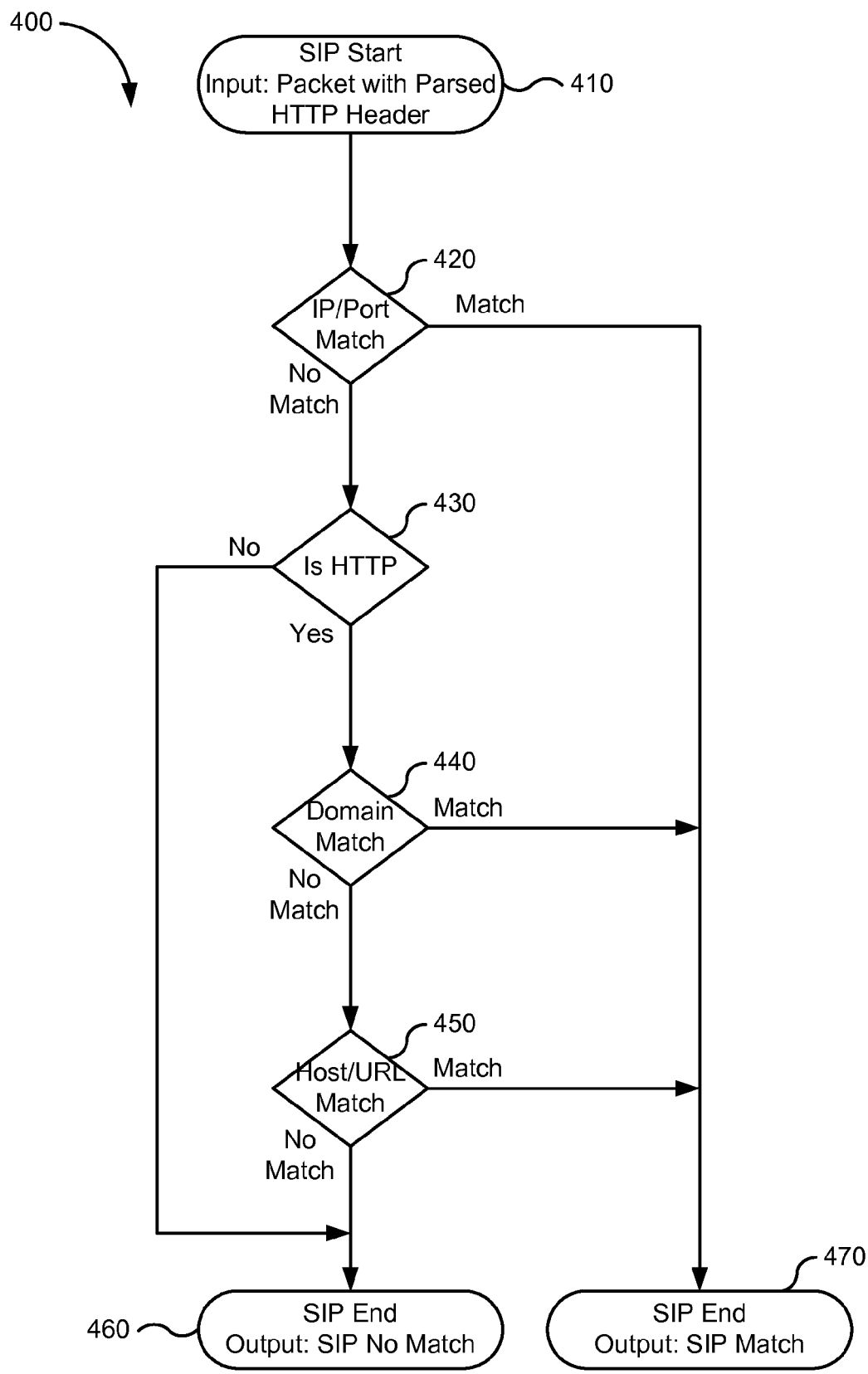
FIG. 4 is a flowchart of a method for single inspection point dissection of network traffic in one embodiment according to the present invention.

FIG. 4 is a flowchart of method 400 for single inspection point dissection of network traffic in one embodiment according to the present invention. Method 400 of FIG. 4 begins in step 410.

In step 410, a packet or other network traffic is received. As discussed above, the network traffic may be pre-processed or parsed (e.g., a parsed HTTP header). In various embodiments, the packet (or its pre-processed information) may be received by a first engine in a sequence or series of inspection engines. In some embodiments, the packet may be access substantially simultaneously by a plurality of inspection engines. As discussed above, an inspection engine can be configured to identify any given application based on network traffic elements or other data points observed by the inspection engine. An inspection engine may be instantiated or updated at run time using a set of rules that configure the engine's analysis of network traffic.

In step 420, a determination is made (e.g., at a first SIP inspection engine in a sequence or series) whether an internet protocol (IP) address or port yields a match. In one example, the first SIP inspection engine may be configured to match IP addresses or IP ports to a predetermined list of network-based applications that use the IP addresses or IP ports. The first SIP inspection engine may be configured to match one of a number of data structures to provide rapid efficient lookup of network-based applications. In various embodiments, a SIP match may conclude further processing. In other embodiments, a SIP match may invoke further processing.

If, for example, a determination is made that a match has been found in step 420, SIP processing then may end. For example, SIP processing of method 400 may end in step 470 by outputting a SIP match. Other information may be output, such as information identifying the network-based application or information quantifying the degree of confidence in the match. If, for example, a determination is made that a match has not been found in step 420, then the processing of method 400 continues in FIG. 430. For example, the packet (or its preprocessed information) may be analyzed by another SIP inspection engine in step 430 or if no other SIP engines remain for analysis, the packet may be forwarded to another inspection layer for processing.

In step 430, a determination is made whether the packet is an HTTP packet. If the packet is not determined to be an HTTP packet in step 430, then processing may end in step 460 where no SIP match has been found. In some embodiments, processing may then continue with MIP processing. Alternatively, if the packet is determined to be an HTTP packet in step 430, then in step 440, a determination is made whether a domain match is found. A domain match may include a determination whether a domain, sub-domain, or domain name matches information associated with the packet (e.g., whether a domain name associated with a source or IP address yields a match). If a determination is reached that a domain match has been found, then in step 470, a SIP match is output as discussed above. If a determination is reached that a domain match has not been found (e.g., a domain name, such as facebook.com, is not being actively blocked), then in step 450, a determination is made whether a hostname or URL match may be found. A hostname or URL match may include a determination whether a hostname or URL matches information associated with the packet (e.g., whether a hostname name associated with a source or IP address yields a match or whether a URL is identified in an HTTP packet). If a determination is made that a hostname or URL match has been found in step 450, then in step 470, a SIP match is output as discussed above. If a determination is made that a hostname or URL has not been found in step 450, then in step 460, no SIP match is output. Processing then may continue for MIP processing.

In various embodiments, one or more optimizations may be utilized by an inspection engine in performing the above-described inspections. For example, a hash-based technique using sparsely populated arrays may be used by one or more inspection engines. One example for hash-based techniques using sparsely populated arrays can be found in commonly owned co-pending U.S. patent application Ser. No. 12/206, 930, filed Sep. 9, 2009 and entitled "Hash-Based Resource Matching," which is herein incorporated by reference in its entirety for all purposes.

Figure 5:
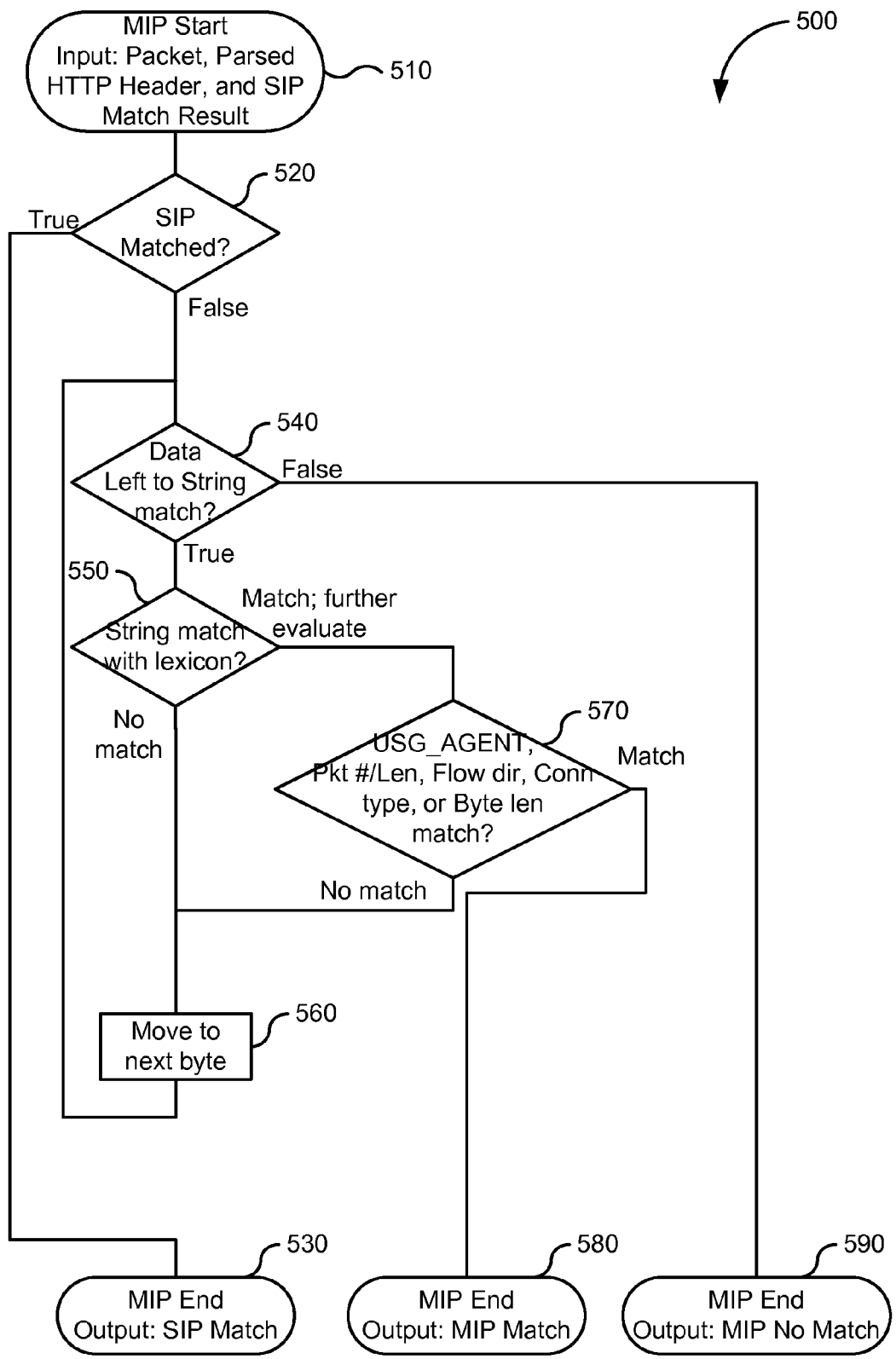
FIG. 5 is a flowchart of a method for multiple inspection point dissection of network traffic in one embodiment according to the present invention.

FIG. 5 is a flowchart of method 500 for multiple inspection point dissection of network traffic in one embodiment according to the present invention. Method 500 begins in step 510.

In step 510, a packet or other network traffic is received. As discussed above, the network traffic may be pre-processed or parsed (e.g., a parsed HTTP header). Additionally, information from the single inspection point (SIP) tier or layer processing may be passed along with the packet and its pre-processed information to a control mechanism for a multiple inspection point tier or layer processing.

In one embodiment, in step 520 for example, if an indication of a SIP match is received, MIP processing is bypassed and ends in step 530 outputting a SIP match. Other information may be output, such as information identifying the network-based application or information quantifying the degree of confidence in the match. Alternatively, if no SIP match has been received or if further processing is desired, the packet (and/or any accompanying information) may be processed by another series or sequence of one or more inspection engines associated with the MIP inspection layer that observe or look at a set of multiple data points, a plurality of data elements, or combinations of elements or match indicators.

For example, string matching may be used to identify an application. An inspection engine may look at one or more pieces of data within a packet to construct a string. For example, in step 540, a determination is made whether data is left to string match. If no data is left to string match in step 540, MIP processing ends in step 590 wherein no MIP match is output. Alternatively, if data is left to string match in step 540, in step 550, a determination is made whether the string matches with a lexicon. The lexicon may be static or dynamically built from observation. If no match is determined in step 550, in step 560, the next byte is determined in the packet. Processing then continues in step 540.

If a match is determined in step 550, in step 570 further evaluation is performed. For example, a match may be determined between agent information, packet number information, packet length information, flow information, connection type information, or the like. If a match is not found in step 570, processing continues in step 560. If a match is found in step 570, in step 580, MIP processing comes to an end where an MIP match is output.

Figure 6:
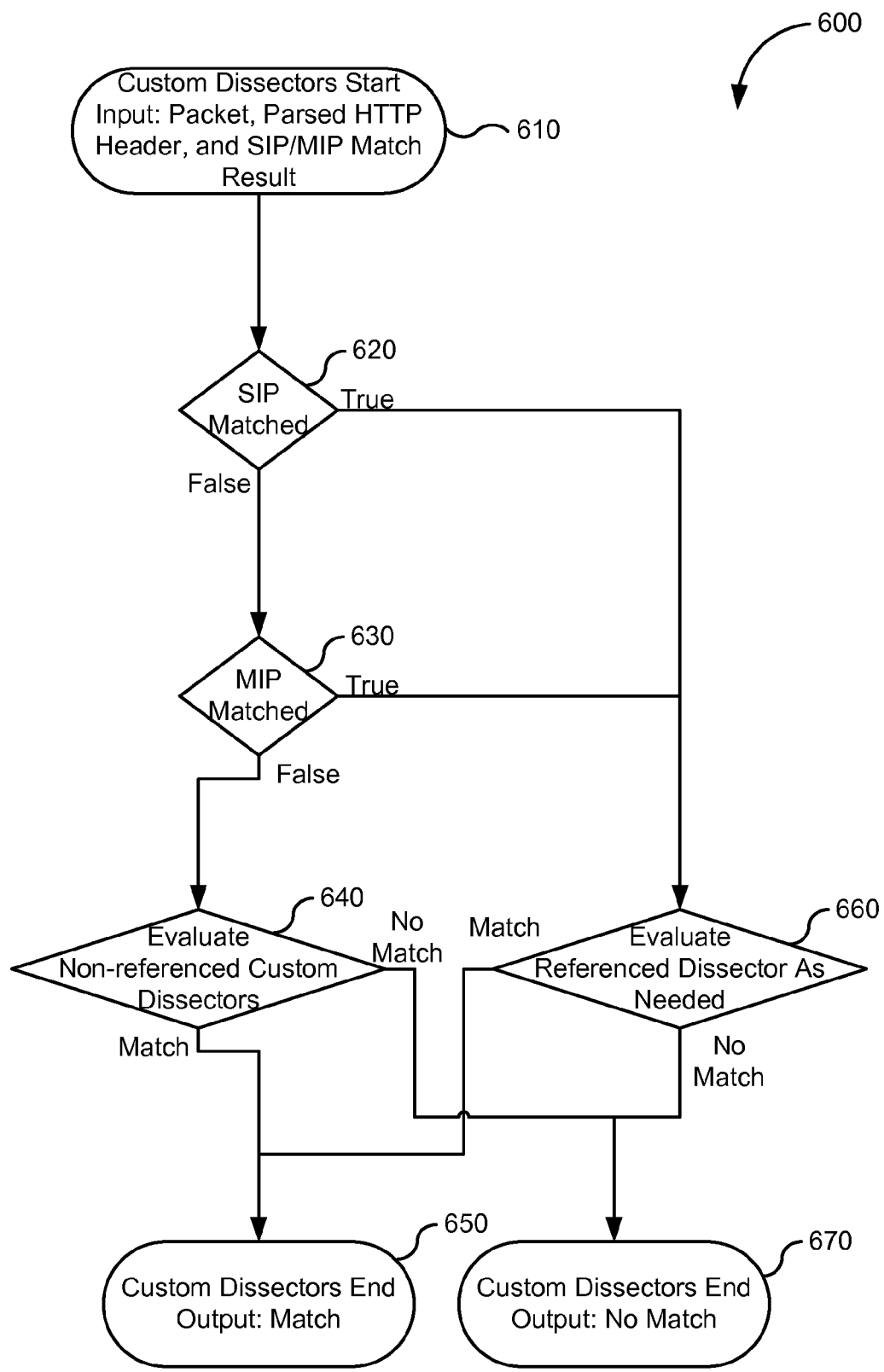
FIG. 6 is a flowchart of a method for dissection of network traffic using custom dissection engines in one embodiment according to the present invention.

FIG. 6 is a flowchart of method 600 for dissection of network traffic using custom dissection engines in one embodiment according to the present invention. Method 600 begins in step 610.

In step 610, information from SIP/MIP tier or layer processing may be passed to a custom inspection point tier. For example, a packet, a parsed HTTP header, and any indication of a SIP/MIP match may be received by a control mechanism for a custom processing tier.

For example, in step 620 in step 630, if a SIP/MIP match indicator has been received in step 660, a determination is made whether to further evaluate the information. For example, a particular data set may be known to cause a threshold of false positives. Therefore, criteria may be established to determine whether to reevaluate or further examine the network traffic in light of the results of a given inspection engine or set of inspection engines.

In steps 620 and 630, if no indication of SIP/MIP match has been provided, in step 640, evaluation is performed with a sequence or series of one or more custom dissectors, or application-specific inspection engines. If no match is found in steps 640 and 660, an indication of no match is output in step 670. If a match is found in either of step 640 and 660, a match is output in step 650.

In further embodiments, network traffic monitor 120 can be dynamic and data driven. Information may be input into a detection database and inspection rules programmatically packaged into data files. These files can be periodically, or on-demand, downloaded to by network traffic monitor 120, and dynamically read in by any of the inspection engines. Additionally, custom dissectors can be added as dynamically load libraries that can be install without recompiling the programs or delivering new software.

Optimizations

In various embodiments, network traffic monitor 120 can include a variety of inspection engines. These inspection engines may be configured for general information inspection or optimized for a specific purpose or application.

In various embodiments, an inspection engine configured as an IP address detector component can identify network-based applications or protocols used by network-based applications based upon IP address, IP port, or a combination of IP address and IP port information. In one embodiment, the higher order 16 bits of an IP address can be used as an index into a sparsely populated array. For example, the size of an IP address array can be 0xFFFF. Each index in the array may contain a pointer to a link list of IP address records. Thus, an entry in the array may hold more than one record. Some entries in the array may not point to any records at all, thus, the array maybe considered "sparsely populated" or that it is a "sparsely populated array."

As most incoming packet's IP address, statistically speaking, may not map to an entry in a sparsely populated array in which case they are not of interest to the inspection engine and may not require further IP inspector evaluation. In some embodiments, a very small percentage of packets can be expected to be of interest to the inspection engine, allowing the engine to distinguish between "interesting" and "uninteresting" packets in a very fast manner. In some embodiments, packets with IP addresses of interest may also be passed to a customer dissector for further evaluation.

In some embodiments, an inspection engine configured as a Hostname to IP Address component can detect network-based applications or protocols associated with network-based applications by the fact that some network-based applications connect to network hosts or servers that have relatively constant IP addresses. In one embodiment, updates can be provided regularly or periodically to the inspection engine to provide the relatively constant IP addresses. For those servers that change IP address, hostnames may be provided to the inspection engine. The inspection engine configured as a Hostname to IP Address component may use DNS queries to convert a hostname to one or more IP address that can be fed to an inspection engine configured as an IP Address inspector. In one embodiment, a component or service may run every 24 hours, for example, and check a set of hostnames for any IP address changes.

In further embodiments, an inspection engine configured as an Octet Inspection Engine can search for binary patterns within a packet. The inspection engine may search for multiple binary patterns (e.g., hundreds or thousands) with only a single pass through the packet. A binary pattern may include a contiguous array of octets. These octets can be a binary data, ASCII, data, a mix of binary or ASCII data, or the like, and can be of any length. The inspection engine may incorporate or employ one or more algorithms that treat an incoming packet as an array of integers, and then use this as an index into a sparsely populated array. The inspection engine may examine one or more bytes of data at a time (e.g., three), for example, by masking off a topmost character. In one embodiment, if the inspection engine determines that there is a "hit" in the sparsely populated array (in other words if all or part of a packet matches a three byte pattern of interest), then the packet may be subject to further inspection. In one embodiment, if there is a match on a primary octet array, then all characters of the potential match may be checked for a match.

In various embodiments, inspection engines configured as IP address and the Octet Inspector Engines may be referred to as MIP inspectors. Once an IP address may be identified, an IP Address Inspector may look at other data points to confirm the match. An Octet Inspector Engine may look at other elements (the presence of other octets matches, IP addresses and ports, packet length, UDP vs. TCP, etc.) to confirm a detection.

In some embodiments, an inspection engine can be configured to uniquely identify a network-based application or protocol associated with a network-based application, or determine that a session is "uninteresting." An inspection engine configured as a signature driven inspector engine, in some numerically rare instances, may need to perform or otherwise initiate additional protocol specific analysis to confirm a presumptive protocol analysis although the engine may have previously detected a match. In some embodiments, if inspection engine determines a match, the inspection engine may look at a match rule, or record, and determine whether the inspection engine should call upon a an inspection engine configured as a custom dissector. As discussed above, inspection engine configured as custom dissectors can be protocol specific and may be loaded dynamically. Some dissectors may hold state information in data structures, call "probes" such that the analysis can span multiple packet. If a custom dissector confirms the analysis, then this information may be passed onto a policy engine for the application of one or more policies.

Figure 7:
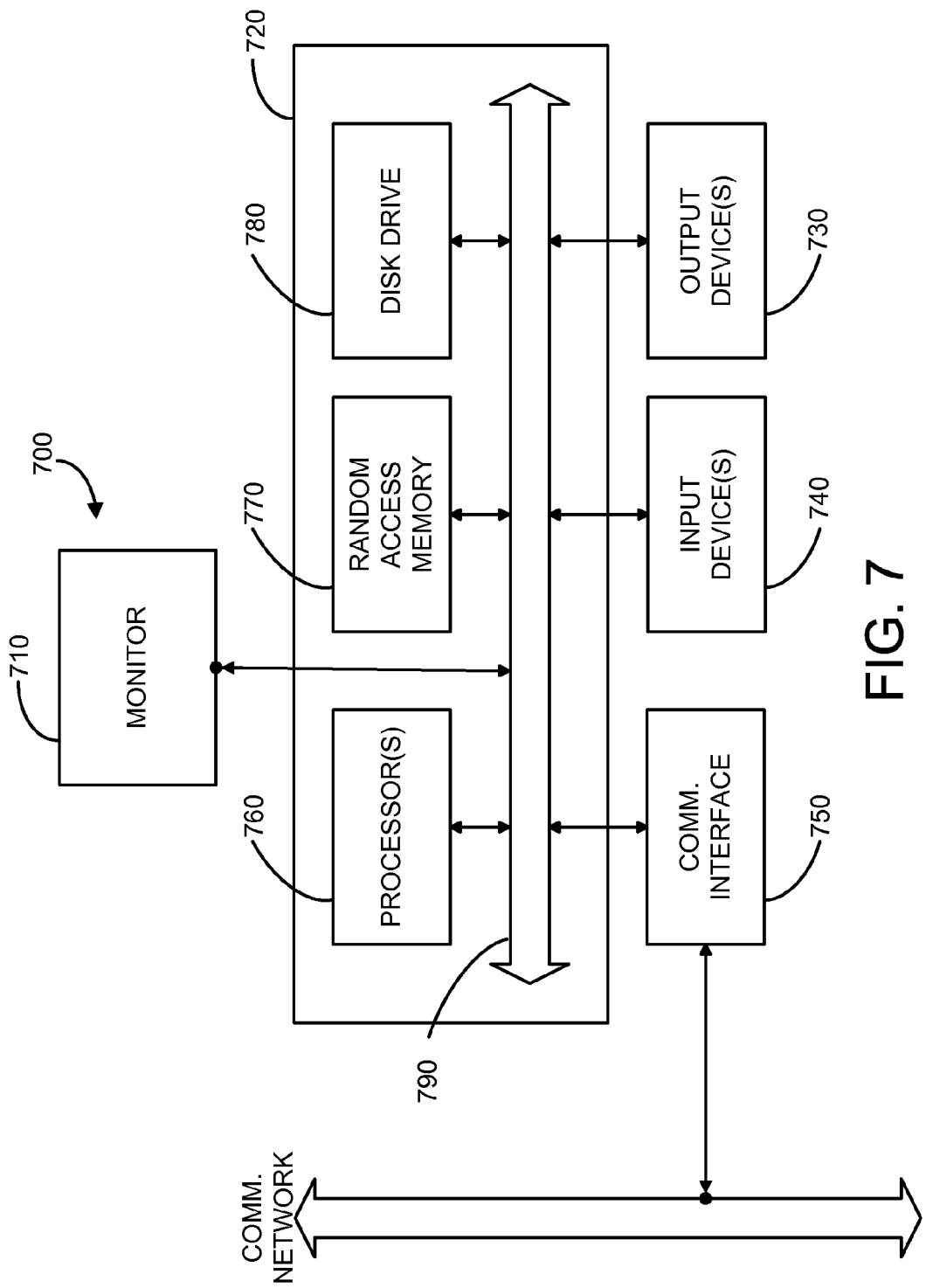
FIG. 7 is a simplified block diagram of a computer system that may incorporate embodiments of the present invention.

FIG. 7 is a simplified block diagram of computer system 700 that may incorporate embodiments of the present invention. FIG. 7 is merely illustrative of an embodiment incorporating the present invention and does not limit the scope of the invention as recited in the claims. One of ordinary skill in the art would recognize other variations, modifications, and alternatives.

In one embodiment, computer system 700 typically includes a monitor 710, a computer 720, user output devices 730, user input devices 740, communications interface 750, and the like.

As shown in FIG. 7, computer 720 may include a processor(s) 760 that communicates with a number of peripheral devices via a bus subsystem 790. These peripheral devices may include user output devices 730, user input devices 740, communications interface 750, and a storage subsystem, such as random access memory (RAM) 770 and disk drive 780.

User input devices 730 include all possible types of devices and mechanisms for inputting information to computer system 720. These may include a keyboard, a keypad, a touch screen incorporated into the display, audio input devices such as voice recognition systems, microphones, and other types of input devices. In various embodiments, user input devices 730 are typically embodied as a computer mouse, a trackball, a track pad, a joystick, wireless remote, drawing tablet, voice command system, eye tracking system, and the like. User input devices 730 typically allow a user to select objects, icons, text and the like that appear on the monitor 710 via a command such as a click of a button or the like.

User output devices 740 include all possible types of devices and mechanisms for outputting information from computer 720. These may include a display (e.g., monitor 710), non-visual displays such as audio output devices, etc.

Communications interface 750 provides an interface to other communication networks and devices. Communications interface 750 may serve as an interface for receiving data from and transmitting data to other systems. Embodiments of communications interface 750 typically include an Ethernet card, a modem (telephone, satellite, cable, ISDN), (asynchronous) digital subscriber line (DSL) unit, FireWire interface, USB interface, and the like. For example, communications interface 750 may be coupled to a computer network, to a FireWire bus, or the like. In other embodiments, communications interfaces 750 may be physically integrated on the motherboard of computer 720, and may be a software program, such as soft DSL, or the like.

In various embodiments, computer system 700 may also include software that enables communications over a network such as the HTTP, TCP/IP, RTP/RTSP protocols, and the like.

In alternative embodiments of the present invention, other communications software and transfer protocols may also be used, for example IPX, UDP or the like.

In some embodiment, computer 720 includes one or more Xeon microprocessors from Intel as processor(s) 760. Further, one embodiment, computer 720 includes a UNIX-based operating system.

RAM 770 and disk drive 780 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 770 and disk drive 780 may be configured to store the basic programming and data constructs that provide the functionality of the present invention.

Software code modules and instructions that provide the functionality of the present invention may be stored in RAM 770 and disk drive 780. These software modules may be executed by processor(s) 760. RAM 770 and disk drive 780 may also provide a repository for storing data used in accordance with the present invention.

RAM 770 and disk drive 780 may include a number of memories including a main random access memory (RAM) for storage of instructions and data during program execution and a read only memory (ROM) in which fixed instructions are stored. RAM 770 and disk drive 780 may include a file storage subsystem providing persistent (non-volatile) storage for program and data files. RAM 770 and disk drive 780 may also include removable storage systems, such as removable flash memory.

Bus subsystem 790 provides a mechanism for letting the various components and subsystems of computer 720 communicate with each other as intended. Although bus subsystem 790 is shown schematically as a single bus, alternative embodiments of the bus subsystem may utilize multiple busses.

FIG. 7 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for detecting network-based applications based on network traffic generated by the network-based applications, the method comprising:
   receiving network traffic at a computer system;
   generating first results information in response to analyzing, in a first phase associated with the network traffic, the network traffic with an ordered sequence of a plurality of single inspection point engines using a processor associated with the computer system based on whether a single inspection point of the network traffic satisfies at least one of the plurality of single inspection point engines;
   generating second results information in response to analyzing, in a second phase associated with the network traffic, the network traffic and results information associated with the one or more single inspection point engines with one or more multiple inspection point engines using the processor associated with the computer system to determine whether a plurality of inspection points of the network traffic satisfy at least one of the multiple inspection point engines;
   generating third results information in response to analyzing, in a third phase associated with the network traffic, the network traffic, results information associated with the one or more single inspection point engines, and results information associated with the one or more multiple inspection point engines with one or more custom inspection point engines using the processor associated with the computer system to determine whether the network traffic satisfies at least one of the custom inspection point engines based on a determination using the second results information;
   identifying, with the processor associated with the computer system, a network-based application that generated the network traffic based on results information obtained from at least one of the second phase or the third phase;
   determining, with the processor associated with the computer system, a policy that is applicable to the network-based application; and
   performing an action defined by the policy in regard to the network-based application.

2. The method of claim 1 wherein analyzing, in the first phase associated with the network traffic, the network traffic with the one or more single inspection point engines provided by the processor associated with the computer system comprises analyzing the network traffic for an IP address, an IP port, presence of a single value in a packet header, or presence of a single value in a packet body.

3. The method of claim 1 wherein analyzing, in the second phase associated with the network traffic, the network traffic and results information associated with the one or more single inspection point engines with the one or more multiple inspection point engines provided by the processor associated with the computer system comprises analyzing the network traffic for a combination of IP address and an IP port, presence of a plurality of values in a packet header, presence of a plurality of values in a packet body, or combinations thereof.

4. The method of claim 1 wherein analyzing, in the third phase associated with the network traffic, the network traffic, results information associated with the one or more single inspection point engines, and results information associated with the one or more multiple inspection point engines with one or more custom inspection point engines provided by the processor associated with the computer system comprises analyzing the network traffic according to processing logic specified by the one or more custom inspection point engines.

5. The method of claim 1 wherein analyzing, in the third phase associated with the network traffic, the network traffic, results information associated with the one or more single inspection point engines, and results information associated with the one or more multiple inspection point engines with one or more custom inspection point engines provided by the processor associated with the computer system comprises maintaining state information with the one or more custom inspection point engines across one or more packets.

6. The method of claim 1 wherein determining, with the processor associated with the computer system, the policy that is applicable to the network-based application comprises determining a set of policies based on one or more characteristics of the network-based application.

7. The method of claim 1 wherein determining, with the processor associated with the computer system, the policy that is applicable to the network-based application comprises:
   determining one or more users associated with the network-based application; and
   determining a set of policies based on information associated with the one or more user.

8. The method of claim 1 wherein performing the action defined by the policy comprises blocking the network traffic generated by the network-based application.

9. The method of claim 1 wherein performing the action defined by the policy comprises modifying the network traffic generated by the network-based application.

10. The method of claim 1 further comprising:
receiving, at the computer system, one or more updates from a service provider that configure at least one of the single inspection point engines, the multiple inspection point engines, or the custom inspection point engines for determining whether the network traffic satisfies a particular inspection point engine.

11. A non-transitory computer-readable storage medium storing a computer program product executable by one or more computer systems for detecting network-based applications based on network traffic generated by the network-based applications, the non-transitory computer-readable storage medium comprising:
code for receiving network traffic;
code for generating first results information in response to analyzing, in a first phase associated with the network traffic, the network traffic with an ordered sequence of a plurality of single inspection point engines to determine whether a single inspection point of the network traffic satisfies at least one of the plurality of single inspection point engines;
code for generating second results information in response to analyzing, in a second phase associated with the network traffic, the network traffic and results information associated with the one or more single inspection point engines with one or more multiple inspection point engines to determine whether a plurality of inspection points of the network traffic satisfy at least one of the multiple inspection point engines;
code for generating third results information in response to analyzing, in a third phase associated with the network traffic, the network traffic, results information associated with the one or more single inspection point engines, and results information associated with the one or more multiple inspection point engines with one or more custom inspection point engines to determine whether the network traffic satisfies at least one of the custom inspection point engines based on a determination using the second results information;
code for identifying a network-based application that generated the network traffic based on results information obtained from at least one of the second phase or the third phase;
code for determining a policy that is applicable to the network-based application; and
code for performing an action defined by the policy in regard to the network-based application.

12. The non-transitory computer-readable storage medium of claim 11 wherein the code for analyzing, in the first phase associated with the network traffic, the network traffic with the one or more single inspection point engines comprises code for analyzing the network traffic for an IP address, an IP port, presence of a single value in a packet header, or presence of a single value in a packet body.

13. The non-transitory computer-readable storage medium of claim 11 wherein the code for analyzing, in the second phase associated with the network traffic, the network traffic and results information associated with the one or more single inspection point engines with the one or more multiple inspection point engines comprises code for analyzing the network traffic for a combination of IP address and an IP port, presence of a plurality of values in a packet header, presence of a plurality of values in a packet body, or combinations thereof.

14. The non-transitory computer-readable storage medium of claim 11 wherein the code for analyzing, in the third phase associated with the network traffic, the network traffic, results information associated with the one or more single inspection point engines, and results information associated with the one or more multiple inspection point engines with one or more custom inspection point engines comprises code for analyzing the network traffic according to processing logic specified by the one or more custom inspection point engines.

15. The non-transitory computer-readable storage medium of claim 11 wherein the code for analyzing, in the third phase associated with the network traffic, the network traffic, results information associated with the one or more single inspection point engines, and results information associated with the one or more multiple inspection point engines with one or more custom inspection point engines comprises code for maintaining state information with the one or more custom inspection point engines across one or more packets.

16. The non-transitory computer-readable storage medium of claim 11 wherein the code for determining the policy that is applicable to the network-based application comprises code for determining a set of policies based on one or more characteristics of the network-based application.

17. The non-transitory computer-readable storage medium of claim 11 wherein the code for determining the policy that is applicable to the network-based application comprises:
code for determining one or more users associated with the network-based application; and
code for determining a set of policies based on information associated with the one or more user.

18. The non-transitory computer-readable storage medium of claim 11 wherein the code for performing the action defined by the policy comprises code for blocking the network traffic generated by the network-based application.

19. The non-transitory computer-readable storage medium of claim 11 wherein the code for performing the action defined by the policy comprises code for modifying the network traffic generated by the network-based application.

20. The non-transitory computer-readable storage medium of claim 11 further comprising:
code for receiving one or more updates from a service provider that configure at least one of the single inspection point engines, the multiple inspection point engines, or the custom inspection point engines for determining whether the network traffic satisfies a particular inspection point engine.

21. A network appliance for detecting network-based applications based on network traffic generated by the network-based applications, the network appliance comprising:
a database storing information for configuring one or more single inspection point engines, one or more multiple inspection point engines, and one or more custom inspection point engines;
a communications interface configured to be coupled to a communications network and receive network traffic;
a processor configured to:
configure the one or more single inspection point engines and generate first results information in response to analyzing, in a first phase associated with the network traffic, the network traffic with an ordered sequence of a plurality of single inspection point engines to determine whether a single inspection point of the network traffic satisfies at least one of the plurality of single inspection point engines;
configure the one or more multiple inspection point engines and generate second results information in response to analyzing, in a second phase associated with the network traffic, the network traffic and results information associated with the one or more single inspection point engines with the one or more multiple inspection point engines to determine whether a plurality of inspection points of the network traffic satisfy at least one of the multiple inspection point engines;

configure the one or more custom inspection point engines and generate third results information in response to analyzing, in a third phase associated with the network traffic, the network traffic, results information associated with the one or more single inspection point engines, and results information associated with the one or more multiple inspection point engines with the one or more custom inspection point engines to determine whether the network traffic satisfies at least one of the custom inspection point engines based on a determination using the second results information;

identify a network-based application that generated the network traffic based on results information obtained from at least one of the second phase or the third phase;

determine a policy that is applicable to the network-based application; and perform an action defined by the policy in regard to the network-based application.

\* \* \* \* \*